(12) United States Patent
Rudberg

(10) Patent No.: US 8,676,142 B2
(45) Date of Patent: *Mar. 18, 2014

(54) ANTENNA DIVERSITY METHOD WITH FALLBACK AND WEIGHTING

(75) Inventor: Mikael Rudberg, Linkoeping (SE)

(73) Assignee: Infineon Technologies AG, Neubiberg (DE)

( * ) Notice: Subject to any disclaimer, the term of this patent is extended or adjusted under 35 U.S.C. 154(b) by 170 days.

This patent is subject to a terminal disclaimer.

(21) Appl. No.: 13/288,016

(22) Filed: Nov. 2, 2011

(65) Prior Publication Data

US 2012/0115428 A1     May 10, 2012

Related U.S. Application Data

(63) Continuation of application No. 11/066,801, filed on Feb. 25, 2005, now Pat. No. 8,064,862.

(51) Int. Cl.
*H04B 1/06*      (2006.01)
*H04B 7/00*      (2006.01)

(52) U.S. Cl.
USPC ........................................ 455/277.2; 455/272

(58) Field of Classification Search
USPC ............ 455/269, 272, 257, 277.1, 277.2, 275
See application file for complete search history.

(56) References Cited

U.S. PATENT DOCUMENTS 5,844,632 A * 12/1998 Kishigami et al. ............ 348/706

* cited by examiner

*Primary Examiner* — Christian Hannon
(74) *Attorney, Agent, or Firm* — SpryIP, LLC

(57) ABSTRACT

In a radio communication station having antennas an antenna diversity system and a gain controllable amplifier the gain of the gain controllable amplifier is set by using a first antenna, the signal levels of signals received at the antennas is measured, a group of antennas is determined having a signal level which exceeds the signal level of the first antenna by no more than a predetermined value, and out of said group of antennas the antenna with the highest signal level is selected out or the first antenna is selected out if said group is empty.

11 Claims, 2 Drawing Sheets

ANTENNA DIVERSITY METHOD WITH FALLBACK AND WEIGHTING

RELATED APPLICATIONS

This application is a Continuation Application of co-pending application Ser. No. 11/066,801, which was filed on Feb. 25, 2005. Application Ser. No. 11/066,801 claims the benefit of the priority date of Swedish Application 0400492-5, filed on Feb. 27, 2004. The contents of each of the foregoing co-pending and Swedish Applications are herein incorporated by reference in their entirety.

BACKGROUND

The present invention relates in general to a method of receiving and processing signals in mobile communication systems and in particular to a method of selecting an antenna in a receiver section of a radio communication station wherein the radio communication station comprises a number N of antennas and the receiver section comprises an antenna diversity system and a gain controllable amplifier.

The key idea when using switched antenna diversity is to have more than one antenna in the receiver. For each received frame the signal level of the received signal, in particular the received signal strength (RSS) is measured for all or a selection of the antennas in the receive path. These RSS measurements are made during the initial preamble part of the frame that is used for receiver training. Before the data part of the frame is entering the receiver, the antenna with the strongest RSS is selected for reception of the rest of the frame. In this way an increased receiver performance will be gained compared to using only one antenna.

During the preamble different tasks have to be performed in the receiver. The most important task is to adjust the signal level to be within the dynamic range of the receiver by setting the gain of the amplifier. This is done by measuring the RSS of the amplified signal and adjusting the gain of the amplifier repeatedly until the signal level is in accordance with the dynamic range of the receiver. This procedure is done using one (i) of the N antennas of the station.

After the gain of the amplifier has been set, the antenna diversity measurements are performed. The last RSS measurement done during the gain setting can be used as RSS estimate for antenna i. For the remaining antennas separate RSS measurements must be performed.

For simplicity it can be assumed that the station comprises two antennas where antenna 1 is used for the gain calculations. There are two situations which can arise after the RSS measurements have been made for both antennas:

1. RSS for antenna 1 is higher than for antenna 2 ($RSS_1 > RSS_2$)
2. RSS for antenna 1 is higher than for antenna 1 ($RSS_2 > RSS_1$)

In case 1 above the gain setting is already as good as it can be since the best antenna is the same antenna as that has been used for gain calculations. In case 2 the antenna not used for gain calculations is found to be the best one and if the difference between the two antennas is large we will need to recalculate the gain again otherwise we might experience a reduced performance compared to always use antenna 1.

The problem is that gain recalculations take time and time is a very limited resource during the preamble.

A further problem of antenna diversity lies in the following. When using more than one antenna in the receiver it is possible that the noise level on all antennas is not equal. The cause of this can be a bad placement of the antennas or that one antenna experiences stronger adjacent channel disturbance. With weak signal levels the received noise level will be so high that it heavily affects the antenna selection. We will choose the antenna with the highest noise level instead of the one with the strongest signal level which would be the correct choice.

The best solution would be if it was possible to estimate the noise level for each received frame and take this into account when selecting antenna. This is however both difficult and expensive in terms of hardware costs.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

One embodiment provides a method of selecting an antenna in a receiver section of a radio communication station wherein said station comprises a number of antennas and said receiver section comprises an antenna diversity system and a gain controllable amplifier, wherein said method allows to select an antenna without conducting gain recalculations. It is a further object of the present invention to take into account static noise levels experienced by each antenna.

The present invention, according to an embodiment, relates to a method of selecting an antenna in a receiver section of a radio communication station, said station comprising a number (N) of antennas and said receiver section comprising an antenna diversity system and a gain controllable amplifier, said method comprising the steps of:

setting the gain of the gain controllable amplifier by using a first antenna of the N antennas;

measuring the signal levels of signals received at the antennas, determining a group of antennas having a signal level which exceeds the signal level of the first antenna by no more than a predetermined value (X), selecting out of said group of antennas the antenna with the highest signal level or selecting the first antenna if said group is empty.

The present invention, according to an embodiment, offers a solution for the above indicated situation wherein a first antenna was used for the gain adjustments and for anyone of the other antennas a signal level or RSS is measured which is higher than that of the first antenna. It is an essential idea of the present invention to determine a group of antennas whose signal levels exceed the signal level of the first antenna by no more than a predetermined value (X) and to select out of this group the antenna with the highest signal level. If the group is empty, the first antenna is selected out.

In the second step of measuring the signal levels it is not necessary to measure the signal level of the first antenna as the signal level value measured in the preceding setting step can be used.

In one aspect of the invention according to an embodiment, no recalculation of the gain of the gain controllable amplifier is carried out after the RSS measurements. Even in the case that one or more antennas have higher signal level than the first antenna which was used for the gain adjustment no readjustment of the gain is conducted and the performance of the antenna diversity system is nonetheless kept at high level.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

Figure 1:
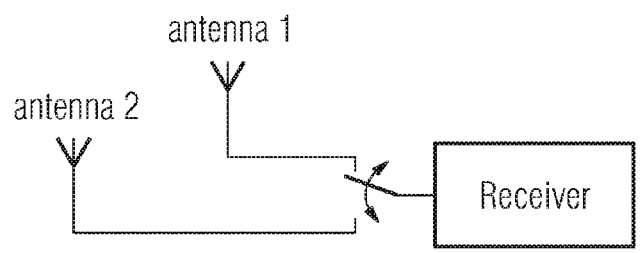
FIG. 1 an outline of a receiver with two antennas.
Figure 2:
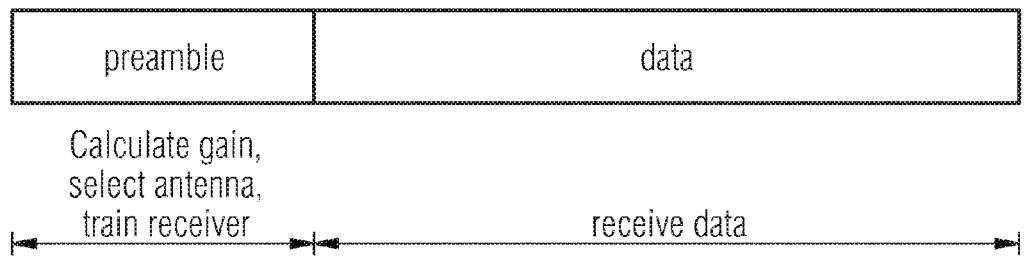
FIG. 2 an outline of a typical frame structure of a WLAN standard.
Figure 3:
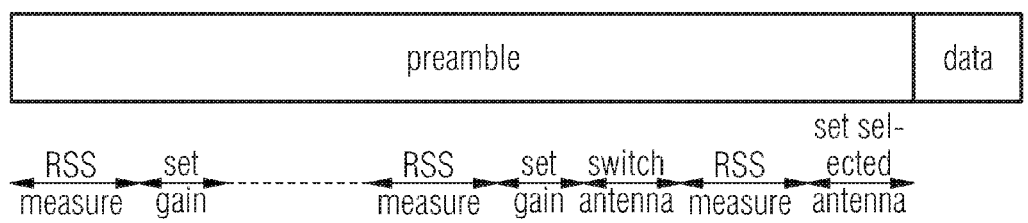
FIG. 3 a simplified outline of the method steps of an embodiment of the present invention.

FIG. 3 shows again a typical frame structure as used in the WLAN standard IEEE 802.11a/g. The preamble contains essentially training symbols to be evaluated in the receiver for purposes of equalisation. After the preamble the information data will be transmitted. It is to be noted that the length of the preamble and of the data block are not to scale on the time axis.

Figure 4:
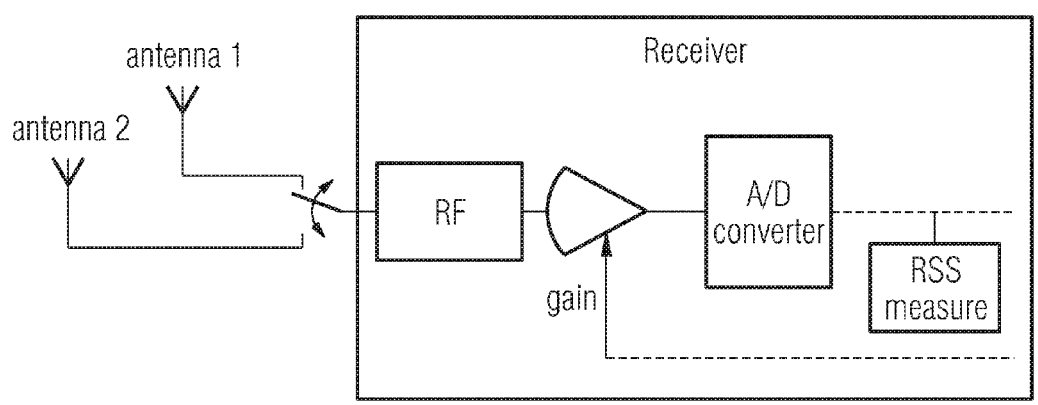
FIG. 4 a receiver structure for utilizing the inventive method.

The inventive method is to be carried out during the preamble. In the gain setting step the signal level of one antenna, i.e. its RSS value is measured after the amplifier as shown in FIG. 4 and thereafter the gain of the gain controllable amplifier is set. This is repeated in an iterative manner until a gain value of the gain controllable amplifier which adequately corresponds to the dynamic range of the receiver is calculated and set. Thereafter, the antenna is switched and RSS values of the other antennas are measured wherein it is not necessary to measure again the RSS value of the first antenna which was used for the gain setting steps. In the last method step an antenna is selected according to the selecting step as outlined above. This selected antenna is then used for receiving the information data.

In a hardware description language like pseudo code the implementation would have the following form:

```
antenna_selection = 1;
RSS_selection = RSS1;
for (i = 2; i ≤ N; i++)
  if ((RSSi − RSS1) > X) then
    // too large signal, do not use this antenna, keep old one
    antenna_selection = antenna_selection
    RSS_selection = RSS_selecton;
  else
    if RSSi > RSS_selection then
      //new antenna better, select it
      antenna_selection = i;
      RSS_selection = RSSi;
    end if
  end if
```

Those lines with a preceding "//" contain descriptive text.

In many cases the radio communication station comprises two antennas and the gain adjustments are carried out with a first antenna which experiences an RSS value of $RSS_1$. The present invention according to claim 1 provides for a method of selecting an antenna without the need for a recalculation of the gain in the case that $RSS_2$ is larger than $RSS_1$. The present invention was based on the assumption that there are some margins in the receiver so that as long as $RSS_2$ not exceeds $RSS_1$ with more than X dB no gain adjustment is needed. If $RSS_2$ is more than X dB stronger $RSS_1$ we fall back to use the first antenna, i.e. antenna 1, since this is the best antenna when there is no additional time for gain adjustments available. An appropriate value of X is dependent on the radio standard and implementation but is probably in the range of 3 to 10 dB. X can be stored in a register making it possible to adapt it for different environments.

In the case of two antennas (N=2) in a hardware description language pseudo-code, the implementation would be:

```
if (RSS2 − RSS1) > X then
  antenna_selection = 1;
else
  if RSS2 > RSS1 then
    antenna_selection = 2;
  else
    antenna_selection = 1;
  end if;
end if.
```

Antenna 2 is selected out if RSS2 exceeds RSS1 by no more than X. In the general terms of claim 1 the group of antennas as determined in the third step only consists of antenna 2.

A further advantageous embodiment of the present invention addresses to the second problem outlined above which is related to the fact that the noise level is not equal on all antennas used. In the preferred embodiment the static noise level experienced by each antenna is more or less continuously estimated. It will not be discussed how these static noise level estimations are carried out as this is common knowledge to a skilled person. In general it is possible to estimate the noise level during the reception of a frame and then to average over several frames to find out the static noise level. The frame based noise level estimation is for instance already implemented in WLAN products available on the market.

According to this preferred embodiment the static noise level estimations are taken into account when performing the antenna diversity method. Accordingly for each antenna this static noise level is determined and subtracted from the measured RSS values. In particular in the above pseudo code descriptions the terms RSS1, RSS2, RSSi and RSS_selection are replaced by the terms RSS1 N1, RSS2 N2, RSSi Ni and RSS_selection-Nselection, where N1, N2, Ni and Nselection are estimated static noise levels for respective antennas. In practice each antenna therefore is provided with a "penalty" or is "weighted" dependent on experienced noise level.

In the case of two antennas, the pseudo code description can be as follows:

```
if (RSS2 − RSS1) > X then
  antenna_selection = 1;
else
  if RSS2 > RSS1 − (N1 − N2) then
    antenna_selection = 2;
  else
    antenna_selection = 1;
  end if;
end if.
```

The difference (N1−N2) between the noise levels N1 and N2 experienced by the two antennas is preferably stored in a register.

The invention claimed is:

1. A method, comprising:
setting a gain based on a signal level of a signal received at a first antenna;
maintaining the gain as set based on the signal level received at the first antenna regardless of which antenna is selected;
measuring a signal level of a signal received at the second antenna;
measuring static noise levels for each antenna;
weighting the signal levels with the static noise levels;
selecting the first antenna if the signal level received at the second antenna exceeds the signal level received at the first antenna by more than a predetermined value;
selecting the first antenna if the signal level received at the first antenna exceeds the signal level received at the second antenna; and
selecting the second antenna if the signal level received at the second antenna exceeds the signal level received at the first antenna by no more than the predetermined value.

2. The method according to claim 1, wherein the signal levels are measured by an RSS method.

3. The method according to claim 2, wherein the method is implemented in accordance with WLAN standard IEEE 802.11a/g.

4. The method according to claim 3, wherein the method is carried out during a preamble of a frame as defined in the WLAN standard.

5. The method according to claim 1, wherein the predetermined value is a value in the range of 3 to 10 dB.

6. The method according to claim 1, wherein the method is implemented in accordance with WLAN standard IEEE 802.11a/g.

7. The method according to claim 6, wherein the method is carried out during a preamble of a frame as defined in the WLAN standard.

8. The method according to claim 1, wherein weighting the signal levels with the static noise levels comprises subtracting the static noise level from the signal level for each antenna.

9. The method according to claim 1, wherein
the second antenna is selected if the signal level received at the second antenna exceeds the signal level received at the first antenna minus a difference between the static noise levels for the first and second antennas,
otherwise the first antenna is selected.

10. The method according to claim 1, further comprising storing the static noise levels in a register.

11. The method according to claim 10, wherein the static noise levels are stored in the register as a difference between the static noise levels for different ones of the antennas.

* * * * *